(12) United States Patent
Goodno et al.

(10) Patent No.: US 9,036,252 B1
(45) Date of Patent: May 19, 2015

(54) NONLINEAR SPECTRALLY NARROWED FIBER AMPLIFIER

(71) Applicant: NORTHROP GRUMMAN SYSTEMS CORPORATION, FALLS CHURCH, VA (US)

(72) Inventors: Gregory D. Goodno, Los Angeles, CA (US); Peter A. Thielen, Long Beach, CA (US); Joshua E. Rothenberg, Los Angeles, CA (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 0 days.

(21) Appl. No.: 14/483,887

(22) Filed: Sep. 11, 2014

(51) Int. Cl.
*H01S 3/13* (2006.01)
*H01S 3/10* (2006.01)
*H01S 3/108* (2006.01)
*H01S 3/30* (2006.01)

(52) U.S. Cl.
CPC .............. *H01S 3/302* (2013.01); *H01S 3/10084* (2013.01); *H01S 3/1086* (2013.01)

(58) Field of Classification Search
USPC ............................................... 359/341.3, 337
See application file for complete search history.

(56) References Cited

U.S. PATENT DOCUMENTS

| | | | |
|---|---|---|---|
| 5,930,024 A * | 7/1999 | Atlas ............................. | 359/279 |
| 7,120,175 B2 | 10/2006 | Rothenberg et al. | |
| 7,233,433 B1 | 6/2007 | Shay | |
| 7,830,596 B1 | 11/2010 | Di Teodoro et al. | |
| 7,903,696 B2 | 3/2011 | Klebanov | |
| 7,974,319 B2 | 7/2011 | Deladurantaye et al. | |
| 8,040,929 B2 | 10/2011 | Imeshev et al. | |
| 8,248,688 B2 | 8/2012 | Baird et al. | |
| 8,411,352 B2 | 4/2013 | Starodoumov et al. | |
| 8,508,844 B2 | 8/2013 | Hertwig et al. | |
| 8,630,036 B2 | 1/2014 | Munroe | |
| 8,630,320 B2 | 1/2014 | Munroe et al. | |
| 2007/0201880 A1 | 8/2007 | Nicholson | |
| 2011/0069376 A1 | 3/2011 | Diening | |
| 2011/0170564 A1 | 7/2011 | Desbiens et al. | |

(Continued)

OTHER PUBLICATIONS

Kakande, Joseph Kagga, "Phase Sensitive Parametric Amplifiers and Their Applications" A thesis, University of Southampton, Mar. 2012, 165 pgs.

(Continued)

*Primary Examiner* — Mark Hellner
(74) *Attorney, Agent, or Firm* — John A. Miller; Miller IP Group, PLC

(57) ABSTRACT

A fiber amplifier system including at least one seed source providing an optical seed beam and a harmonic driver providing a sinusoidal drive signal at a predetermined frequency. The system also includes a harmonic phase modulator that receives the seed beam and the drive signal, where the harmonic phase modulator frequency modulates the seed beam using the drive signal so as to remove optical power from a zeroth-order frequency of the seed beam and create sidebands separated by the frequency of the drive signal. A dispersion element receives the frequency modulated seed beam and provides temporal amplitude modulation to the seed beam and a nonlinear fiber amplifier receives the amplitude modulated seed beam from the dispersion element and amplifies the seed beam, where the dispersion element and the fiber amplifier combine to remove optical power from the sidebands and put optical power back into the zeroth-order frequency.

20 Claims, 2 Drawing Sheets

(56) References Cited

U.S. PATENT DOCUMENTS

| | | |
|---|---|---|
| 2011/0280581 A1 | 11/2011 | Chann et al. |
| 2012/0327960 A1 | 12/2012 | Wise et al. |
| 2013/0044768 A1 | 2/2013 | Ter-Mikirtychev |
| 2013/0301664 A1 | 11/2013 | Prather et al. |
| 2014/0086267 A1* | 3/2014 | Dennis et al. ............... 372/6 |
| 2014/0233035 A1* | 8/2014 | Islam ............... 356/456 |

OTHER PUBLICATIONS

Nilsson, Dr. John, "Fiber-Based 589 nm Laser for Sodium Guide Star" Final Report, Grant No. FA8655-04-1-3065, University of Southampton, Feb. 2006, 22 pgs.

Ryu, Hye-Seung, "Optical Single Sideband Modulation Using a Semiconductor Laser under Modulated Light Injection" A Master's Thesis, The Graduate School Yonsei University, Jan. 2004, 67 pgs.

* cited by examiner

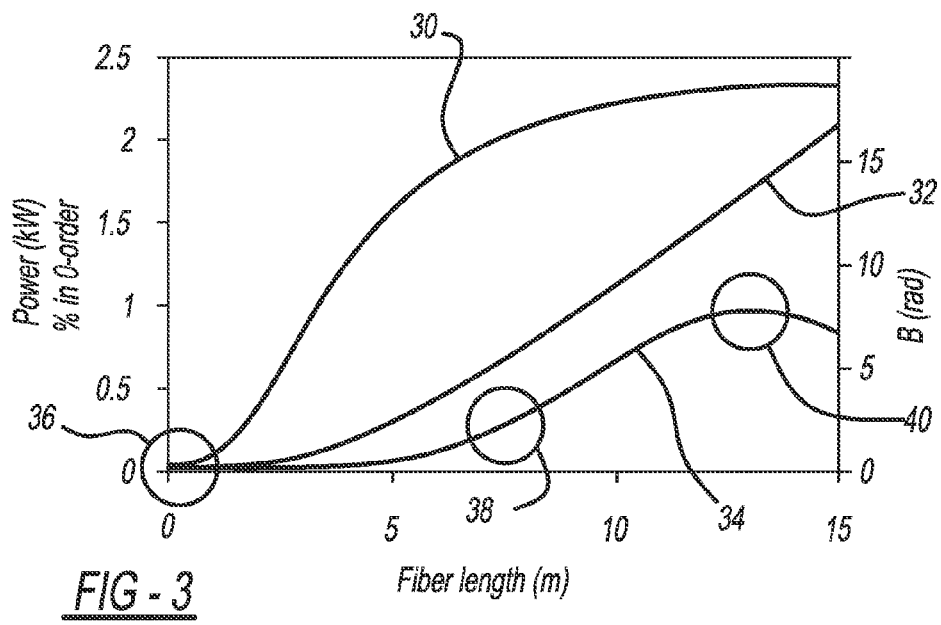
FIG - 3
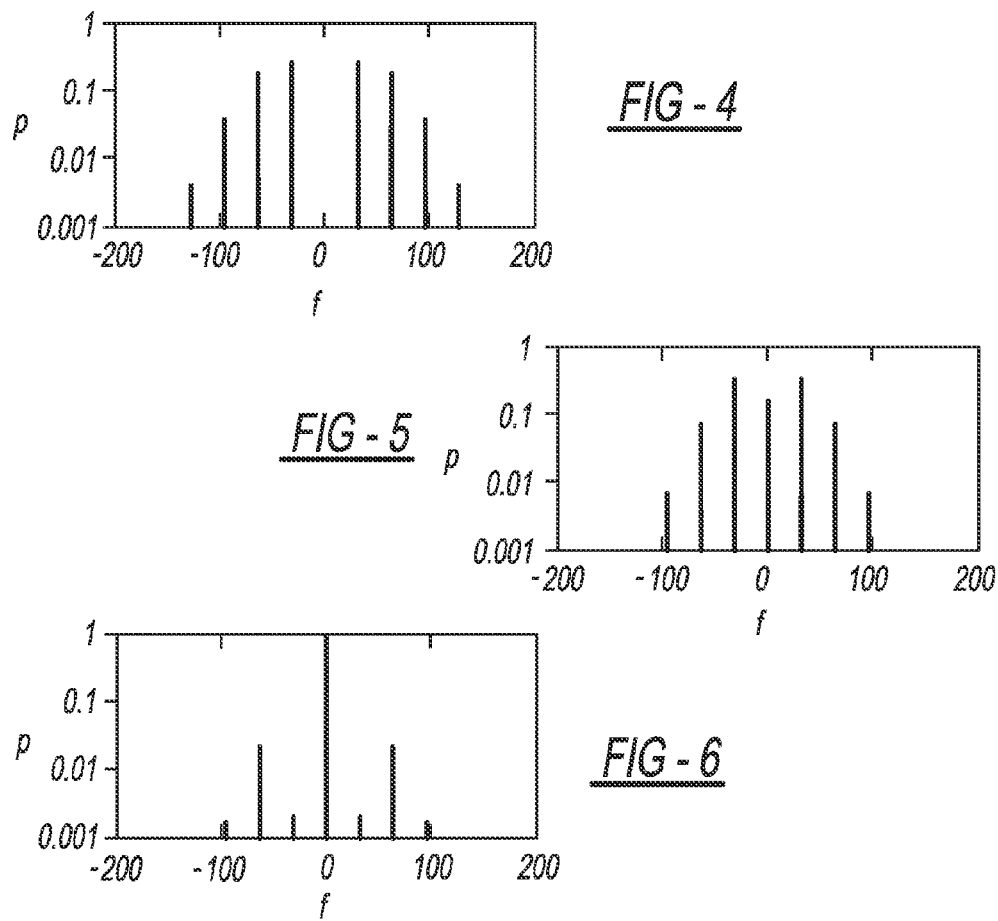
FIG - 4
FIG - 5
FIG - 6

NONLINEAR SPECTRALLY NARROWED FIBER AMPLIFIER

BACKGROUND OF THE INVENTION

1. Field

This invention relates generally to a fiber laser amplifier having higher power and narrower linewidth and, more particularly, to a fiber laser amplifier that includes a harmonic phase modulation device that applies an RF frequency modulation (FM) signal to a seed beam to remove optical power from a zeroth-order frequency and create harmonic sidebands of the beam, where the modulated beam is temporally dispersed before being amplified by a non-linear amplifier.

2. Discussion

High power laser amplifiers have many applications, including industrial, commercial, military, etc. Designers of laser amplifiers are continuously investigating ways to increase the power of the laser amplifier for these and other applications. One known type of laser amplifier is a fiber laser amplifier that employs a doped fiber that receives a seed beam and a pump beam to amplify the seed beam and generate the laser beam, where the fiber has an active core diameter of about 10-20 µm or larger.

Improvements in fiber laser amplifier designs have increased the output power of the fiber to approach its practical power and beam quality limit. To further increase the output power of a fiber amplifier some fiber laser systems employ multiple fiber laser amplifiers that combine the amplified beams in some fashion to generate higher powers. A design challenge for fiber laser amplifier systems of this type is to combine the beams from a plurality of fiber amplifiers in a manner so that the beams provide a single beam output having a uniform phase over the beam diameter such that the beam can be focused to a small focal spot. Focusing the combined beam to a small spot at a long distance (far-field) defines the quality of the beam.

In one known multiple fiber amplifier design, a master oscillator (MO) generates a seed beam that is split into a plurality of fiber seed beams each having a common wavelength, where each fiber beam is amplified. The amplified fiber seed beams are then collimated and directed to a diffractive optical element (DOE) that combines the coherent fiber beams into a single output beam. The DOE has a periodic structure formed into the element so that when the individual fiber beams each having a slightly different angular direction are redirected by the periodic structure all of the beams diffract from the DOE in the same direction. Each fiber beam is provided to a phase modulator that controls the phase of the beam so that the phase of all the fiber beams is maintained coherent. However, limitations on bandwidth and phasing errors limits the number of fiber beams that can be coherently combined, thus limiting the output power of the laser.

In another known multiple fiber amplifier design, a plurality of master oscillators (MOs) generate a plurality of fiber seed beams at a plurality of wavelengths, where each fiber beam is amplified. The amplified fiber seed beams are then collimated and directed to a diffraction grating, or other wavelength-selective element, that combines the different wavelength fiber beams into a single output beam. The diffraction grating has a periodic structure formed into the element so that when the individual fiber beams each having a slightly different wavelength and angular direction are redirected by the periodic structure all of the beams diffract from the diffraction grating in the same direction. However, limitations on bandwidth limit the number of fiber beams that can be wavelength-combined, thus limiting the output power of the laser.

To overcome these limitations and further increase the laser beam power, multiple master oscillators are provided to generate seed beams at different wavelengths, where each of the individual wavelength seed beams is split into a number of fiber seed beams and where each group of fiber beams has the same wavelength and are mutually coherent. Each group of the coherent fiber seed beams at a respective wavelength are first coherently combined by a DOE, and then each group of coherently combined beams are directed to a spectral beam combination (SBC) grating at slightly different angles that diffracts the beams in the same direction as a single combined beam of multiple wavelengths. The SBC grating also includes a periodic structure for combining the beams at the different wavelengths.

It is often desirable that the output beam from a fiber amplifier be narrow linewidth, i.e., have a narrow frequency range, to improve beam quality. However, providing both high power and narrow linewidth have heretofore been challenging in the art because those requirements are typically incompatible with each other because higher power typically requires a wider beam linewidth. More particularly, the phenomenon of stimulated Brillouin scattering (SBS) i.e., back scattering of the beam as it propagates along the fiber amplifier, increases at narrower linewidths with small frequency ranges, which acts to reduce beam power. However, the wider the beam linewidth, the more difficult it is to coherently combine or spectrally combine beams from multiple fibers into a single beam through known beam combining techniques. Particularly, dispersion effects from an SBC grating require that the linewidth of the beams being amplified is narrow, where spectral dispersion causes the spectral components of the beam to be diffracted at different angles. In other words, for SBC, the spectral brightness of the seed beam directly limits the theoretical brightness of the combined beam output.

For coherent beam combining (CBC), the spectral brightness of the seed beam limits the combining efficiency owing to imperfect matching of group delay and dispersion between amplifiers. Typically, the source spectral brightness is limited by SBS, and the seed beam source to the fiber amplifier must be frequency-modulated to reduce the peak SBS gain and achieve the desired output power. The FM spectral broadening limits the attainable spectral brightness from a single fiber amplifier, thus limiting the system output.

In order to overcome these limitations in the known fiber laser amplifier systems, designers of fiber amplifiers typically employ one or more phase modulators before the amplification stage in the fiber amplifier to reduce the linewidth via frequency modulation. However, once the modulation is applied to the beam before it is amplified, that widening of the spectral content of the beam is carried through the amplifier resulting in a low spectral brightness amplified beam. Hence, there is a need in the art for fiber amplifiers having a higher spectral brightness that is currently obtainable by FM broadening.

BRIEF DESCRIPTION OF THE DRAWINGS

FIG. 3 is a graph with fiber length on the horizontal axis, beam power on the left vertical axis and B-integral on the right vertical axis showing amplified optical power along a length of a fiber laser amplifier; and FIGS. 4-6 are graphs with frequency on the horizontal axis and optical power on the vertical axis showing optical power in the zeroth-order frequency at different lengths along the fiber amplifier.

DETAILED DESCRIPTION OF THE EMBODIMENTS

The following discussion of the embodiments of the invention directed to a fiber laser amplifier including employing harmonic FM modulation to the beam is merely exemplary in nature, and is in no way intended to limit the invention or its applications or uses.

As discussed above, fiber laser amplifiers are limited in output power and beam quality because of the incompatibility between high power and narrow linewidth. In order to overcome these limitations, the present invention proposes leveraging the intrinsic dispersion and optical Kerr nonlinearity of high power fiber amplifiers so as to spectrally compress a harmonic frequency modulated (FM) broadband laser beam source.

Figure 1:
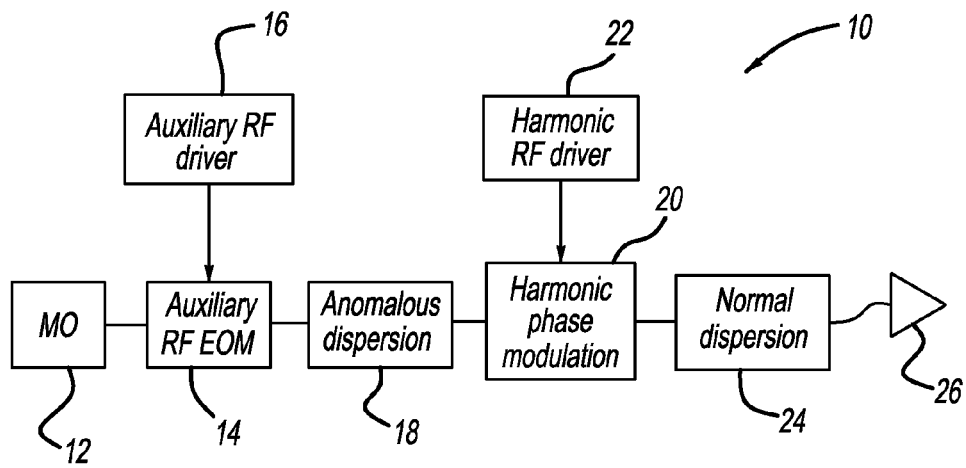
FIG. 1 is a schematic block diagram of an input portion of a fiber laser amplifier system.

FIG. 1 is a schematic block diagram of a portion of a fiber laser amplifier system 10 illustrating such a fiber laser amplifier. The laser system 10 includes a master oscillator 12 that generates a seed beam at a particular wavelength. The seed beam is provided to an auxiliary RF electro-optical modulator (EOM) 14 that is controlled by an auxiliary RF driver device 16 to provide the modulation. The combination of the EOM 14 and the RF driver device 16 provide a conventional technique for providing frequency modulation broadening, such as white noise or pseudo-random bit sequence (PRBS), and may not be required or desired in some amplifier systems. The modulated optical beam from the master oscillator 12 is then dispersed by an anomalous dispersion block 18 to generate a modulated and dispersed optical seed beam, where the dispersion block 18 may also not be required in some systems.

The seed beam is then sent to a traveling wave harmonic phase modulator 20, such as an EOM, that receives a harmonic sinusoidal RF drive signal from a harmonic RF driver 22 that provides frequency modulation of the seed beam. In one non-limiting example for discussion purposes herein, the sinusoidal RF signal provided by the driver 22 is 32 GHz, which is twice the scattering frequency caused by SBS in silicon fiber. However, it is stressed that other high frequency sinusoidal drive signals can also be employed in various applications. The harmonic frequency modulation provided by the phase modulator 20 generates an optical seed beam that includes spaced apart spectral components or sidebands that are defined by the frequency and amplitude of the drive signal. In the non-limiting described example herein, the spectral content of the seed beam will include frequency spikes separated by 32 GHz.

Figure 2:
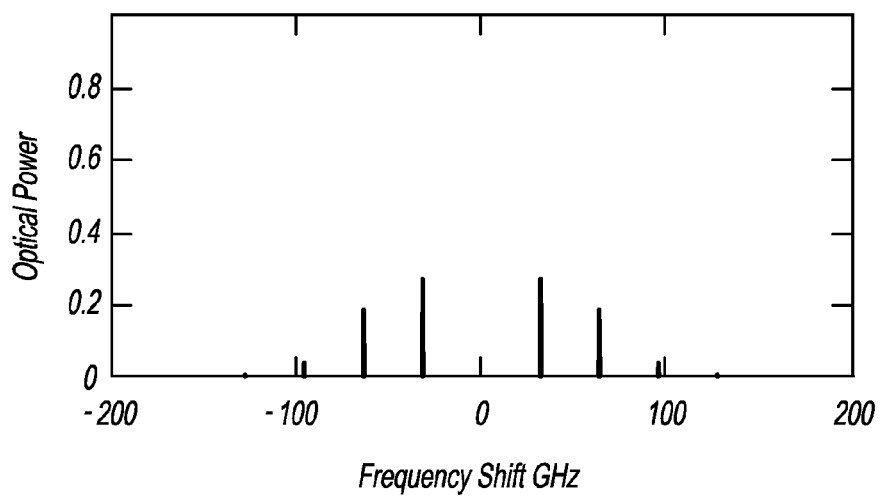
FIG. 2 is a graph with frequency on the horizontal axis and optical power on the vertical axis showing a spectrum of an FM modulated light beam.

FIG. 2 is a graph with frequency shift relative to the master oscillator frequency on the horizontal axis and optical power on the vertical axis showing the spectral content of the seed beam after frequency modulation for this example including a modulation depth $\beta=2.4$ radians, where the frequency sidebands in the graph are harmonics of the main zeroth-order frequency separated by 32 GHz, and where the zeroth-order frequency of the seed beam entering the modulator 20 would be at zero. The amplitude of the RF drive signal from the driver 22 is selected depending on whether frequency content is desired at the zero frequency location and the number and amplitude of frequency spikes at the sidebands, where a higher magnitude signal would generate more sidebands. As the amplitude of the drive signal increases, more light gets scattered out of the zeroth-order frequency band and creates more sidebands. For example, the amplitude of the drive signal may be selected to remove all power from the zeroth-order frequency of the seed beam in the phase modulator. Alternately, the amplitude of the drive signal may be selected to create equal amplitude powers in the zeroth and +/−first order frequencies of the seed beam in the phase modulator.

The frequency modulated seed beam from the modulator 20 is then sent through a dispersion element 24 that provides temporal dispersion of the spectral content of the seed beam, where the higher frequency and shorter wavelength spectral content of the seed beam are delayed relative to the lower frequency and longer wavelength spectral content. As the shorter wavelengths of the seed beam is delayed relative to the longer wavelengths of the seed beam as the beam propagates, the spectral content of the seed beam interferes with each other creating time domain power oscillations at the original modulation frequency (32 GHZ in this example). How much dispersion that is provided by the dispersion element 24 controls the amplitude of power oscillation within the beam. Thus, the frequency modulated seed beam provided by the modulator 20 is converted into an amplitude modulated (AM) seed beam after the dispersion element 24.

The AM seed beam is then sent to a fiber amplifier 26, which may be a plurality of fiber amplification stages each including a pump beam and a length of doped fiber, such as a ytterbium (Yb) doped length of fiber having a 10-20 μm core. Because of the nonlinear Kerr effect in the fiber amplifier 26, where a higher phase shift in the optical beam occurs at higher power, the interaction of the AM modulated power oscillations in the optical beam creates synchronous phase shifts of the beam in the fiber amplifier 26. Therefore, by tailoring the amount of dispersion provided by the dispersion element 24 in conjunction with the nonlinear phase shifts in the amplifier 26, the harmonic frequency modulation provided by the modulator 20 can be cancelled. It is noted that in practice, the functionality of the dispersion element 24 can be naturally present in the amplifier 26 since the long length of the fiber in the fiber amplifier 26 imposes dispersion.

By cancelling the harmonic modulation in the optical signal through this effect, all or most of the power in the optical beam can be put back into the zeroth-order frequency of the original beam. The change in the spectrum between the input and output of the amplifier 26 reduces the spectral overlap of backscattered SBS from different locations in the length of the fiber amplifier 26. This increases the SBS threshold in comparison to a seed spectrum without harmonic modulation. In other words, as a result of there being no spectral content of the seed beam in the zeroth-order frequency when the beam enters the dispersion element 24 there is no back scattering of light at that frequency and as the optical power gets put back into the zeroth-order frequency as the beam travels through the fiber amplifier 26, the SBS increases, but is limited by the reduction of the optical power in the zeroth-order frequency earlier in the beam propagation.

The fiber laser amplifier system 10 discussed above can be part of any suitable fiber amplifier system, where those skilled in the art would understand how the various components would be arranged consistent with the discussion herein. For example, if the fiber amplifier system 10 is part of a coherent beam combining (CBC) fiber amplifier system, the frequency modulated seed beam would be split after the modulator 20 into multiple channels, where each amplifier channel would include a separate dispersion element 24 and a separate nonlinear fiber amplifier 26. Each channel would also include a phase actuator. Also, some or all of the dispersion elements 24 could be implemented in a common dispersive block, and then split to feed all the fiber amplifiers. If the fiber amplifier system 10 is part of a spectral beam combining (SBC) fiber amplifier system, then there would be multiple of the fiber amplifier systems 10, each operating at different wavelengths and having no common components.

At laser wavelengths less than 1.3 µm, the dispersive element 24 may be lengths of normally dispersive actively doped fiber as provided in multi-stage fiber amplifiers, thus providing low power amplification and dispersion simultaneously. For laser wavelengths that are greater than 1.3 µm, where most fibers exhibit anomalous dispersion, the dispersive element 24 may be a device, such as a fiber Bragg grating (FBG) or free space grating stretcher, that cancels out any anomalous dispersion and yields net normal dispersion after propagation through the dispersion element 24.

FIG. 3 is a graph with fiber length on the horizontal axis, optical power on the left vertical axis and B-integral on the right vertical axis showing the nonlinear spectral narrowing through sideband suppression providing mitigation of SBS in a fiber amplifier system as discussed above. The graph in FIG. 3 represents the length of the fiber amplifier in the last stage of a multistage fiber amplifier. Line 30 represents the amplified power in the fiber, line 32 represents the B-integral in the fiber, which is a measure of the accumulated nonlinear strength in the fiber, and graph line 34 is the optical power in the zeroth-order spectral harmonic of the beam.

FIGS. 4-6 are graphs with frequency on the horizontal axis and optical power on the vertical axis at different positions along the length of the fiber amplifier in the last stage. Particularly, FIG. 4 shows that at location 36 on the line 34, which is the beginning of the fiber amplifier 26, there is 0% optical power in the zero-order frequency of the fiber. FIG. 5 shows that at location 38 at 6.5 meters into the fiber amplifier 26 there is 18% optical power in the zeroth-order frequency, and FIG. 6 shows that at location 40 at 13 meters into the fiber amplifier 26 there is 95% optical power in the zeroth-order frequency.

In this example, the seed beam is initially modulated to eliminate all of the power from the fundamental frequency and the power is spectrally compressed into the fundamental order as the seed beam is amplified and the B-integral increases. The back-scattered SBS Stokes light from any point in the fiber amplifier 26 will be representative of the local spectrum at that point. Since the forward propagating beam through much of the fiber amplifier 26 has very low spectral overlap with the return wave back-scattered near the output end of the fiber amplifier 26, the SBS gain will be much lower than without the side bands. This increases the threshold for SBS and enables a higher spectral brightness output than conventional techniques for FM without SPM-compression. Moreover, a judicious choice of the modulation frequency to be twice the SBS Stokes shift, i.e., 32 GHz, largely can eliminate self-seeding effects from reducing the SBS threshold.

To ensure maximum compression efficiency into the fundamental frequency (zeroth-order), the magnitude of the SPM can be adjusted by either adding or subtracting fiber before the amplifier 26, which increases or decreases the dispersive AM, or adding a passive delivery fiber after the amplifier 26, which increases the B-integral.

The modulation technique discussed herein both reduces the input seed spectral brightness, and reduces the spectral overlap between the forward and back-scattered SBS light, without increasing the output amplified linewidth. This will substantially increase the SBS threshold in comparison to traditional FM broadening without nonlinear compression. The required parameters of fiber length, dispersion coefficients, nonlinearities, modulation depths and modulation frequencies lie fortuitously in a range that is compatible with demonstrated commercial fiber amplifiers, EOMs and RF electronics.

The above described process works in combination with traditional techniques for SBS suppression via broadband non-harmonic FM. For example, an auxiliary FM format, such as a white noise source (WNS) or a pseudo-random bit sequence (PRBS) frequency modulation, can be serially applied to broaden the MO 12 prior to the dispersive medium (this is shown by the EOM 14 and the driver 16). As long as the spectral breadth of the WNS or PRBS is small compared to that of the sideband modulation, the dispersion-induced FM to AM conversion and the consequent nonlinear AM to FM conversion will both be dominated by the sidebands, thus allowing recovery of the auxiliary FM-broadened spectrum. This can be seen by multiplying equation (4) below by a global, time dependent phasor that represents the FM from the WNS/PRBS modulation. This phasor term disappears in the exponent of equation (6) below showing that WNS/PRBS FM simply propagates into the output without any distortion.

In the more general case, in which the auxiliary FM bandwidth is comparable to or even greater than the FM harmonic modulation frequency, then the auxiliary dispersion block 18 may be used. The auxiliary dispersion block 18 imposes anomalous (opposite sign) dispersion to pre-compensate (cancel) the main dispersion element 24, hence eliminating any AM arising from the auxiliary FM format at the final nonlinear element without affecting the desired harmonic AM needed for harmonic spectral compression.

The modulation technique of the seed beam discussed above is mathematically expressed below. An MO seed laser emitting a single frequency beam with angular frequency $\omega_0$ is phase-modulated by the modulator 20 with a modulation depth $\beta$ and a modulation angular frequency $\omega_{mod}$ as:

$$E_{FM}(t) = e^{i\omega_0 t + i\beta\,\cos(\omega_{mod} t)}. \tag{1}$$

This beam can be expanded as a superposition of harmonics using the Jacobi-Anger identity as:

$$E_{FM}(t) = \Sigma_{n=-\infty}^{\infty} i^n J_n(\beta) e^{i\omega_n t}. \tag{2}$$

Here, $J_n$ are Bessel functions of the first kind, and the harmonic frequencies are defined as:

$$\omega_n = \omega_0 + n\omega_{mod}. \tag{3}$$

For the modulation parameters shown in FIG. 2, the total spectral width is greater than 100 GHz, and the fraction of power in the fundamental frequency is nearly zero.

Because the initial modulation is purely FM, the intensity is initially constant in time at the output of the modulator 20. After propagation through a length L of normally dispersive LMA fiber (represented by the dispersion element 24) with a group velocity dispersion (GVD) parameter $D_A$, each frequency component acquires a dispersive phase shift $\phi_{disp}(\omega_n)$ such that the resulting laser field at the output the dispersion element 84 is:

$$E_{disp}(t) = \Sigma_{n=-\infty}^{\infty} i^n J_n(\beta) e^{i\omega_n t + i\phi_{disp}(\omega_n)}, \tag{4}$$

where the dispersive phase shift is:

$$\phi_{disp}(\omega_n) = \pi c D_\lambda L \left(\frac{n\omega_{mod}}{\omega_0}\right)^2. \quad (5)$$

This dispersion will result in some conversion of FM to AM, with the result that the intensity profile is now time-varying at the output of the dispersion element 24, even though the power spectrum is unchanged. For example, with the modulation parameters shown in FIG. 2, propagating through L=100 m of fiber with dispersion parameter $D_\Lambda$=−30 ps/nm/km (typically for large mode area fibers at a 1064 nm wavelength) changes the intensity profile at the output of the dispersion element 24 compared to the intensity profile at the input to the dispersion element 24. The intensity profile at the output of the dispersion element 24 exhibits 40% time-dependent power variation mostly at the fundamental modulation frequency (32 GHz in this example). Fiber lengths on the order of 100 m are typical for laser channels within a coherently combined fiber amplifier system, where each channel contains multiple fiber actuators, fiber-coupled isolators, fiber pump combiners, fiber taps, fiber gain stages and interconnect fibers.

Finally, the dispersed field is amplified to high power and propagates through a medium characterized by a nonlinear Kerr phase shift B for un-modulated light, i.e., with 0 AM, corresponding to $|E(t)|^2=1$. It is assumed that dispersion accumulated over the nonlinear length is negligible. Since the dispersed field amplitude $|E_{disp}(t)|$ is time-dependent, the output field acquires a time-dependent nonlinear phase shift due to self-phase modulation:

$$E_{NL}(t) = E_{disp}(t) e^{iB|E_{disp}(t)|^2}. \quad (6)$$

In a normal dispersion fiber ($D_\Lambda$<0), the FM generated by SPM can destructively interfere with the original FM imposed by the modulator. Tailoring the magnitude of the B-integral will change the magnitude of the nonlinear FM, and it is possible to recover almost all of the FM light back into the fundamental mode. For example, with a B-integral of 13.4 rad (typical for 1-2 kW commercial fiber amplifiers), about 95% of the output power is shifted to the fundamental mode.

The original seed light has 0% of its power in the fundamental frequency (the zeroth-order harmonic), but the nonlinearly compressed output has ~95% of its power in the fundamental. It is noted that 100% conversion back to the fundamental order is impossible, since the AM is still present on the output, i.e., self-phase modulation can only eliminate the frequency modulation, but it cannot change the AM. However, it is possible to get >99% of the power back into the fundamental order for cases of interest for SBS suppression. For example, with the same parameters as above, but with a lower modulation depth β=1.44 rad (tailored for equal power sidebands in the 0, ±1 FM orders), 99.2% of the output power can be obtained in the fundamental order. The key to high efficiency spectral compression is to minimize the dispersive AM, which is uncorrectable, as well as ensuring that the shape of the AM is nearly sinusoidal so that the SPM phase is nearly sinusoidal to cancel the original sinusoidal FM.

It is useful to develop an analytic approximation for the above process that is valid in the limit of small AM. The instantaneous frequency Ω(t) of the modulated field from equation (1) can be written as:

$$\Omega(t) \equiv \frac{d\phi(t)}{dt} = \omega_0 - \beta\omega_{mod}\sin(\omega_{mot}t). \quad (7)$$

The AM from GVD will maximize where Ω(t) is changing most quickly, i.e., the AM ~dΩ/dt. The exact form for small AM is:

$$\frac{I(L,t)}{I(0,t)} = -\frac{d^2k}{d\omega^2}L\frac{d\Omega(t)}{dt} = \quad (8)$$

$$\frac{d^2k}{d\omega^2}L\beta\omega_{mod}^2\cos(\omega_{mod}t) = -2\pi c\left(\frac{\omega_{mod}^2}{\omega_0^2}\right)D_\lambda L\beta\cos(\omega_{mod}t).$$

Thus, the AM leads to a positive SPM addition to the equation (1) exponent:

$$E_{NL}(t) = \exp[i(\omega_0 t + \beta\cos(\omega_{mod}t)) - \quad (9)$$

$$ik0LNL1 + I0 - 2\pi c\omega mod 2\omega 02D\lambda L\beta\cos\omega mod t.$$

Here, $L_{NL}$ is the nonlinear length of the final amplifier stage, which is distinct from L which is the length of the dispersive medium. Writing this in terms of the B-integral $B=2\pi n_2 L_{NL} I_0/\lambda_0 = k_0 n_2 L_{NL} I_0$ and ignoring the carrier terms, gives:

$$E_{NL}(t) = \exp\left[i\beta\cos(\omega_{mod}t)\left(1 + 2\pi c B D_\lambda L\left(\frac{\omega_{mod}^2}{\omega_0^2}\right)\right)\right]. \quad (10)$$

It can be seen that the net result for a normal dispersion fiber ($D_\lambda$<0) is that the nonlinear phase due to SPM destructively adds with the original sinusoidal frequency modulation. The modulation cancels exactly when:

$$1 + 2\pi c D_\lambda B L \frac{\omega_{mod}^2}{\omega_0^2} = 0. \quad (11)$$

Hence, the optimum nonlinearity $B_{opt}$ to cancel FM will be:

$$B_{opt} = -\frac{\omega_0^2}{2\pi c D_\lambda L \omega_{mod}^2}. \quad (12)$$

For the numeric example worked above, the optimum nonlinearity is:

$$B_{opt} = \quad (13)$$

$$-\frac{(282 \ THz)^2}{2\pi(3\times 10^8 \ m/s)(-30 \ ps/nm/km)(100 \ m)(32 \ GHz)^2} = 13.7 \ \text{rad}.$$

This is in good agreement with the optimum B=13.4 rad determined numerically using the exact expression of equation (6). Hence, equation (12) can help identify useful ranges for a given level of non-linearity, or help determine the tolerances over which near 100% spectral compression to the fundamental order can be achieved.

Another use of the small AM approximation is to identify the maximum possible compression efficiency. Presuming good matching of the B-integral, nearly all the FM can be eliminated, leaving mostly AM. For small AM, almost all of the power will be in the 0 and +/−1 order sidebands. Assuming an AM field of the form:

$$E_{AM}(t)=1+m\cos(\omega_{mod}t), \quad (14)$$

it can be seen that for small m the power in the sidebands is simply $m^2/2$, and the peak-to-peak variation in the time domain of the intensity is roughly 4m. So, for ~40% peak-to-peak modulation corresponding to the numeric example worked above, m=0.1, and the lost sideband power is ~0.5%. This is in reasonable agreement with the numerically found limit of 99.2% spectral compression. The accuracy of this approximation is limited due to the small AM limit, but it does provide an upper bound for the spectral compression efficiency. The actual combining efficiency is also limited by the deviation of the AM shape from a pure sinusoid, which will prevent full compensation of FM.

For this concept to work, the total dispersion and B-integrals must be matched as described by equation (12). In the limit of small mismatch, it can be determined how much of the power is still contained in the FM sidebands. Applying the Jacobi-Anger identity to equation (10) it is easy to see the power fraction in the fundamental is simply:

$$\left(J_0\left[\beta+2\pi c\beta BD_\lambda L\left(\frac{\omega_{mod}^2}{\omega_0^2}\right)\right]\right)^2. \quad (15)$$

For small arguments x, $J_0(x)\approx 1-x^2/4$. Hence, the lost sideband power is approximately:

$$\text{Loss}=\frac{\beta^2}{2}\left[1+2\pi cBD_\lambda L\left(\frac{\omega_{mod}^2}{\omega_0^2}\right)\right]^2. \quad (16)$$

The nonlinear B-integral can be written as $B=B_{opt}+\delta B$, where $\delta B\ll B_{opt}$ is a small deviation from perfect B-integral matching as defined by equation (12). Hence, equation (16) becomes:

$$\text{Loss}=2(\pi\beta cD_\lambda L)^2\left(\frac{\omega_{mod}}{\omega_0}\right)\delta B^2. \quad (17)$$

It can be seen that matching must be more precise as the dispersion ($D_\lambda\cdot L$), modulation depth ($\beta$), or modulation frequency increases. For the numeric example above, it can be found that to keep spectral compression to within 1% of its optimum, i.e., to achieve >98.2% power in the fundamental, which requires $\delta B<0.8$ rad, or within ±6% of the optimum B=13.4 rad. This is straightforward to achieve in practice by either tailoring the length of the delivery fibers, or by tuning the diode pump power to the amplifier.

The foregoing discussion disclosed and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A fiber amplifier system comprising:
at least one seed source providing an optical seed beam;
a harmonic driver providing a sinusoidal drive signal at a predetermined frequency;
a harmonic phase modulator responsive to the seed beam and the drive signal, said harmonic phase modulator frequency modulating the seed beam using the drive signal so as to remove optical power from a zeroth-order frequency of the seed beam and create sideband frequencies that are separated by the frequency of the drive signal;
a first dispersion element responsive to the frequency modulated seed beam and providing temporal amplitude modulation of the seed beam; and
a nonlinear fiber amplifier receiving the amplitude modulated seed beam from the first dispersion element and amplifying the seed beam, wherein the first dispersion element and the fiber amplifier combine to remove optical power from the sidebands and put optical power back into the zeroth-order frequency of the beam so as to suppress stimulated Brillouin scattering (SBS).

2. The system according to claim 1 wherein the optical seed source is a master oscillator.

3. The system according to claim 1 wherein the amplitude of the drive signal is selected to remove all power from the zeroth-order frequency of the seed beam in the phase modulator.

4. The system according to claim 1 wherein the amplitude of the drive signal is selected to create equal amplitude powers in the zeroth and +/−first order frequencies of the seed beam in the phase modulator.

5. The system according to claim 1 wherein the drive signal has a frequency of 32 GHz.

6. The system according to claim 1 wherein the first dispersion element is a predetermined length of optical fiber.

7. The system according to claim 6 wherein the first dispersion element is part of the fiber amplifier.

8. The system according to claim 1 further comprising an auxiliary electro-optic phase modulator (EOM) receiving the seed beam before the harmonic phase modulator.

9. The system according to claim 8 further comprising a second dispersion element that receives the seed beam from the auxiliary EOM before the harmonic phase modulator, said second dispersion element providing pre-cancellation of the temporal amplitude modulation provided by the first dispersion element.

10. The system according to claim 1 wherein the fiber amplifier is a last amplification stage in a plurality of series connected amplification stages.

11. A fiber amplifier system comprising:
at least one seed source providing an optical seed beam;
a harmonic RF driver providing a sinusoidal drive signal at a predetermined frequency;
a harmonic phase modulator responsive to the seed beam and the drive signal, said harmonic phase modulator frequency modulating the seed beam using the drive signal so as to remove optical power from a zeroth-order frequency of the seed beam and create sidebands that are separated by the frequency of the drive signal, wherein the amplitude of the drive signal is selected to remove all power from the zeroth-order frequency of the seed beam in the phase modulator or is selected to create equal amplitude powers in the zeroth and +/−first order frequencies of the seed beam in the phase modulator;

a first dispersion element responsive to the modulated seed beam and providing temporal amplitude modulation to the seed beam; and a non-linear fiber amplifier receiving the amplitude modulated seed beam from the first dispersion element so as to cause optical power in the sideband frequencies to be compressed back into the zeroth-order frequency during amplification of the seed beam so as to suppress stimulated Brillouin scattering (SBS).

12. The system according to claim 11 wherein the drive signal has a frequency of 32 GHz.

13. The system according to claim 11 wherein the first dispersion element is a predetermined length of optical fiber.

14. The system according to claim 13 wherein the first dispersion element is part of the fiber amplifier.

15. The system according to claim 11 further comprising an auxiliary electro-optic phase modulator (EOM) receiving the seed beam before the harmonic phase modulator.

16. The system according to claim 15 further comprising a second dispersion element that receives the seed beam from the auxiliary EOM before the harmonic phase modulator, said second dispersion element providing pre-cancellation of the temporal amplitude modulation provided by the first dispersion element.

17. A method for amplifying an optical beam, said method comprising:
providing an optical seed beam;
providing a sinusoidal drive signal at a predetermined frequency;
frequency modulating the seed beam using the drive signal so as to remove optical power from a zeroth-order frequency of the seed beam and create sideband frequencies that are separated by the frequency of the drive signal;
temporally amplitude modulating the frequency modulated seed beam; and
amplifying the amplitude modulated seed beam in a non-linear fiber amplifier so that optical power is removed from the sidebands and put back into the zeroth-order frequency of the beam so as to suppress stimulated Brillouin scattering (SBS).

18. The method according to claim 17 wherein the amplitude of the drive signal is selected to remove all power from the zeroth-order frequency of the seed beam during frequency modulation.

19. The system according to claim 17 wherein the amplitude of the drive signal is selected to create equal amplitude powers in the zeroth and +/−first order frequencies of the seed beam during frequency modulation.

20. The method according to claim 17 wherein temporally amplitude modulating the seed beam is performed in the fiber amplifier.

* * * * *